United States Patent [19]

Nimberger

[11] Patent Number: 4,672,728
[45] Date of Patent: Jun. 16, 1987

[54] PRESSURE SIGNAL INSTRUMENTATION HAVING REMOVABLE FLANGES AND MOUNTING METHOD THEREFOR

[75] Inventor: Spencer M. Nimberger, Houston, Tex.

[73] Assignee: General Screw Products Company, Houston, Tex.

[21] Appl. No.: 832,872

[22] Filed: Feb. 26, 1986

Related U.S. Application Data

[63] Continuation-in-part of Ser. No. 666,668, Oct. 31, 1984, Pat. No. 4,582,089.

[51] Int. Cl.⁴ .................. B21D 53/00; F16L 23/00
[52] U.S. Cl. ............................ 29/157 R; 29/428; 29/469; 137/269; 137/884; 251/151; 285/161; 285/414; 73/201
[58] Field of Search ............ 29/157 R, 428, 469, 29/700, 282; 73/201, 861.42, 861.61; 137/269, 271, 861, 884; 251/148, 151; 285/12, 18, 120, 131, 158, 159, 161, 177, 328, 333, 367, 368, 414; 403/335, 336

[56] References Cited

U.S. PATENT DOCUMENTS

| | | | |
|---|---|---|---|
| 3,317,003 | 5/1967 | Lukas | 137/269 X |
| 3,337,181 | 8/1967 | Wennerstrom | 285/328 X |
| 3,431,935 | 3/1969 | Bowditch | 137/269 |
| 3,741,236 | 6/1973 | Pass et al. | 137/269 |
| 3,944,264 | 3/1976 | Mong et al. | 285/161 X |
| 4,193,420 | 3/1980 | Hewson | 73/201 X |
| 4,476,897 | 10/1984 | Morrill | 137/271 X |

Primary Examiner—Howard N. Goldberg
Assistant Examiner—Ronald S. Wallace
Attorney, Agent, or Firm—Norvell & Associates

[57] ABSTRACT

An instrument manifold and pressure transducer are provided for detecting a pressure differential across an orifice fitting. Removable flanges are utilized on the output side of the orifice fitting, and on the input and the output ends of the manifold. Each flange may be structurally secured to its respective piece of equipment by special nipples, and is provided with apertures for receiving bolts to interconnect the flanges and the equipment. The versatility of the equipment is substantially increased, the response time and signal reliability is increased, and the installation costs are reduced.

20 Claims, 7 Drawing Figures

PRESSURE SIGNAL INSTRUMENTATION HAVING REMOVABLE FLANGES AND MOUNTING METHOD THEREFOR

RELATED CASE

The patent application is a continuation-in-part of U.S. Ser. No. 666,668, filed Oct. 31, 1984, and now U.S. Pat. No. 4,582,089.

FIELD OF THE INVENTION

The present invention relates to apparatus for use with orifice assemblies to transmit and detect pressure signals and, more particularly, relates to removable flanges for interconnecting an orifice fitting to a valve manifold and a pressure transducer.

BACKGROUND OF THE INVENTION

Instrument manifolds are commonly utilized in differential pressure systems between the source of the differential pressure and the pressure transducer, monitor, or meter. In a typical installation, a three-valve instrument manifold is installed between an orifice flange and a transmitter, and is used to (a) normally transmit two different pressures to the transmitter, and (b) intermittently test the reliability of the transmitter. The testing of the transmitter may be accomplished by several techniques, including opening a "crossover valve" so as to subject the transmitter to the same pressure on both sides of the differential pressure transmitter.

Without regard to the number of control valves, prior art instrument manifolds are basically of two types: (1) those designed for direct coupling on the input and/or the output ends of the manifold; and (2) those designed for remote coupling. The manifold ends designed for direct coupling utilize a flange integral with the manifold body, while ports in the manifold ends designed for remote coupling are tapped for receiving threaded fittings.

The interconnection of an instrument manifold to both the orifice flange and the differential pressure sensor may thus be made by either a remote coupling or a direct (close) coupling. Referring first to a remote coupling for an orifice flange/manifold interconnection, this interconnection is typically made between the two threaded ports of the orifice flange and the two threaded input ports of the manifold by flaired-end pliable tubing and hydraulic end connectors. With this remote coupling, the manifold may be located at a selected distance generally exceeding six inches from the orifice flange, and the manifold is typically structurally supported separate from the orifice flange. Similarly, a remote coupling between the manifold and the transmitter may be made with pliable tubing and end connectors, and the transmitter may also be located a selected distance from the manifold and structurally supported separate from the manifold. An advantage for remote coupling relates to the flexibility in placing the instrument manifold and the pressure sensor at any desired location relative to the orifice flange. Also, remote coupling of manifold flanges has often been preferred because of the availability of instrument manifolds at reasonable costs having tapped ½ inch NPT input and output ports.

On the other hand, there are significant and sometimes critical advantages to direct coupling over remote coupling. Using direct coupling, the spacing between the transmitter and the orifice flange may be minimized to achieve a high speed of response to a change of differential pressure. This reduction in spacing also minimizes the detrimental effects on signal accuracy due to pressure pulsations in the flow lines between the orifice and the transmitter. Fewer fluid-tight interconnections are required for direct coupling so that there is a reduced number of leak points and increased pressure signal reliability. Each of the passageways interconnecting the orifice flange to the transmitter may be provided along a central axis, thereby simplifying rod-out operations and reducing maintenance costs. Also, installation costs may be substantially reduced when using direct coupling, in part because the instrument manifold and transmitter do not require separate support structures. The manifold and transmitter may be mounted on a single support, or both the manifold and transmitter may be sufficiently supported by their interconnections to the orifice flange affixed to the flow lines so as to require no additional support.

The disadvantages of the prior art are overcome by the present invention. Improved apparatus is hereinafter provided for securing a flange to a standard instrument manifold designed for remote coupling. Utilizing another orifice fitting flange, the valve manifold of the present invention can thus be easily mounted to the orifice fitting, and both the manifold and transmitter may be supported by the orifice fitting.

SUMMARY OF THE INVENTION

The instrument manifold according to the present invention includes a manifold body having first and second passageways connecting two inlet ports and two exit ports each threaded for remote mounting. The manifold includes a cross-over valve and a selected number of control valves. One or both ends of the instrument manifold may be provided with a flange having a plurality of apertures for enabling the flange to be directly mounted to corresponding upstream or downstream equipment. The flange is structurally secured in rigid engagement with the instrument manifold by a pair of specially designed nipples each including a passageway for maintaining fluid communication between the valve manifold and the upstream or downstream equipment.

When the manifold is mounted to an orifice fitting having NPT ports in the body portion with a substantially planar surface adjacent the ports, a first flange may be mounted to the orifice fitting with a pair of specially designed nipples. Second and third identical flanges may be connected to the input and output ends of the manifold, respectively, with each flange also mechanically connected to the manifold by a corresponding pair of special nipples. The second manifold has a plurality of aperatures spaced outwardly of the nipples for receiving bolts, which are threaded to corresponding threaded ports in the first flange. Similarly, the transmitter may be directly mounted to the third flange by a plurality of bolts. A rigid assembly is thus provided between the orifice fitting and the transmitter, and the valve manifold and transmitter may be supported by the orifice fitting.

When an orifice flange assembly having a curvilinear surface adjacent the ports is utilized, a standard multi-port gauge valve may be threadably connected to each port, and a first flange then connected to the planar face of the gauge valve. This embodiment allows for flexibility in positioning the manifold relative to the orifice flanges, and also allows for redundancy in pressure signal transmission by a monitor connected to other ports in the gauge valve. In the alternative, a special spacer block may be utilized with a vertical adapter block. These components allow vertically positioned ports in the orifice flange assembly to be connected to horizontally positioned input and ports in the manifold. In either case, however, a mechanically rigid and fluid tight assembly is provided between the orifice fitting and the manifold, and the manifold is mounted in close relationship to the orifice fitting.

Accordingly, it is a feature of the invention to provide an improved assembly for interconnecting an orifice fitting to a valve manifold, and for interconnecting a valve manifold to a transmitter.

It is a further feature of the invention to provide an assembly between an orifice fitting and a transmitter which will reduce the response time between the orifice fitting and transmitter.

It is another feature of the invention to provide an assembly between an orifice fitting and transmitter which will have substantially few fluid tight interconnections, thereby reducing the likelihood of leaks, while also providing high flexibility for various installation preferences.

Still another feature of the invention is to increase signal reliability between an orifice fitting and a transmitter by reducing the effects of pulsation.

Finally, it is a feature of the invention to provide an assembly between an orifice fitting and transmitter which will have substantially reduced installation and maintenance costs.

These and other features and advantages of the present invention will become apparent from the following detailed description, wherein reference is made to the Figures in the accompanying drawings.

DETAILED DESCRIPTION

Figure 1:
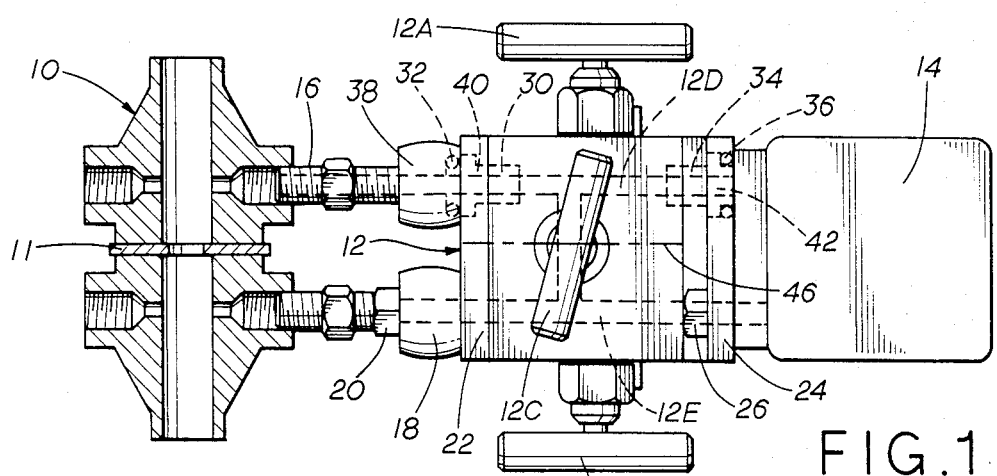
FIG. 1 is a top view, partially in cross-section, of a typical installation including an instrument manifold according to the present invention interconnected between an orifice flange and a differential pressure transducer.

Referring to FIG. 1, a typical installation of an instrument manifold according to the present invention is depicted in a close or direct mounting interconnection with transmitter 13, and with standard pipe nipples between the orifice flange assembly and the manifold. The manifold includes body member 12 having first and second line block valves 12A and 12B for controlling fluid flow through corresponding passageways 12D and 12E, and a crossover valve 12C for controlling flow through crossover passageway 12F.

In a typical installation, the transmitter 14 is used to monitor the pressure differential across an orifice plate 11 in assembly 10 and thereby measure the flow rate through the orifice flange assembly. In some applications, it may also be necessary to quantitatively measure the upstream or downstream static pressure in order to calculate flow rates through the orifice flange. The assembly as shown in FIG. 1 is typically used to measure the quantity of liquid or gas passing through a pipeline (not shown) interconnected to the orifice flange. The end of the manifold adjacent the orifice containing the pressure input ports is commonly referred to as the "process side", and the end of the manifold adjacent the transmitter 14 is commonly referred to as the "instrument side."

Pressure on both the upstream and downstream sides of the orifice plate is therefore separately passed through a nipple 16, an elliptical-shaped football flange 18, a process-side nipple 30, passageway 12D or 12E in the manifold body 12, instrument-side nipple 34, and to transmitter 14. Transmitter 14 may either detect the differential in pressure values between the upstream and downstream sides of restriction 11, or the static pressure value at either of these locations and the differential in pressure values. Normally, valves 12A and 12B are therefore open and crossover valve 12C is closed. In order to check the accuracy of the reading from the transmitter, valve 12B may be closed and crossover valve 12C opened. The transmitter is thereby subjected to this same pressure (in this case, the pressure on the downstream side of the orifice plate 11), and the differential pressure reading from the transmitter should therefore be zero.

Flange 22 is structurally interconnected to and in engagement with manifold body 12 by a pair of specially-designed nipples 30 each having a central passageway 40. The removable flange 24 on the instrument side of the manifold is similarly structurally secured to and in engagement with the manifold body by a pair of nipples 34 each having a passageway 42. Flanges 22 and 24 may thus separately be removed from the manifold body and reinstalled on the same manifold body or another manifold body, depending upon whether a remote or direct coupling is desired.

Each nipple 30 is threaded in fluid-tight manner to the tapped ½ inch NPT sidewalls of an input port, and each nipple 34 is similarly threaded to an exit port. A seal 32 provides sealing engagement between each football and nipple 30, and a seal 36 provides sealing engagement between nipple 34 and the flanged end of a transmitter. On the process-side, fluid pressure is transmitted from the passageway 38 in football 18 to each passageway in the body 12 solely through nipple 30. On the instrument-side, the fluid pressure is transmitted from each passageway in the manifold 12 to the transmitter 14 solely through the nipple 34. No portion of flange 22 or flange 24 thus is required to be in sealed engagement with another component to prevent loss of fluid.

Flange 22 having first and second nipple receiving apertures may be secured to the valve body by first and second special nipples 30. Each nipple 30 has ½ inch NPT threads for engagement with corresponding threaded sidewall portions of an input port for either the first or second passageways 12D, 12E through the valve body. A circular-shaped stop portion or shoulder on the nipple 30 is adapted for engagement with a similar circular-shaped lip portion surface on the flange 22, forcing the flange 22 into engagement with the manifold. The spacing between the stop portion and the threads on the nipple and the spacing between the lip portion surface and the interior surface of the flange 212 are controlled so that the substantially planar surface of the flange comes into secured engagement with the end of the manifold body when the threads obtain sealed engagement with the input port. Once the fitting 30 is secured to the body 12, no substantial movement of the flange with respect to the body will thereafter occur.

Figure 4:
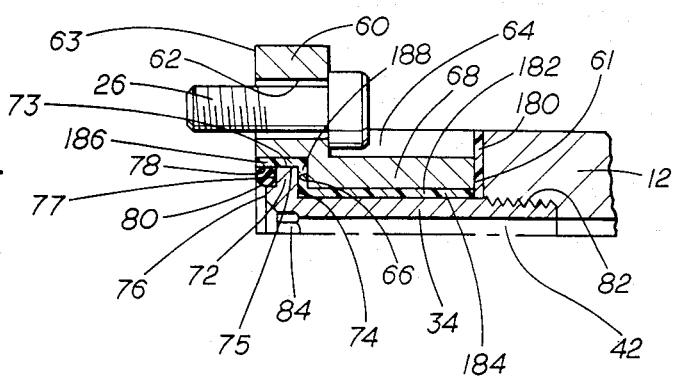
FIG. 4 is a side view, partially in cross-section, of a portion of a suitable flange and fitting for mounting on the instrument side of an instrument manifold.

Referring now to FIG. 4, the removable flange 24 and nipple 34 for the instrument side of the manifold will now be discussed. The instrument side flange 24 includes a first relatively thin rectangular-shaped portion 60 having dimensions similar to flange 22, and a second attached body portion 68 having a width of portion 60 and a height substantially corresponding to manifold body 12. Four direct mounting apertures 62 are provided in the portion 60 for receiving bolts 26, so that the flange may be rigidly secured to the transmitter 14. The aperatures 62 are preferably provided at centerline spacings of approximately 1.625 inches, which is the standard spacing between apertures on the transmitter flange. The heads of the bolts 26 are provided on the manifold body side of the flange 24, and the portion 68 of the flange may be provided with four curvilinear-shaped cutouts 64 allowing the bolt heads to rotate within the cutouts for threading the bolts to the transmitter. The instrument side of the flange is provided with first and second nipple receiving apertures for each of the nipples 34.

Each nipple 34 may thus be sealed with the body 12 by NPT threads as the substantially planar inner surface 61 of the flange comes into secured engagement with the body 12. Accordingly, the spacing between the substantially circular stop surface 74 and the threads of the nipple and the spacing between the substantially circular lip engaging portion 66 and the interior surface 61 of the flange are closely controlled. Close tolerance is also maintained between an outer diameter 33 of the nipple 34 and an inner diameter 25 of the nipple receiving aperture in the flange 24, so that the flange 24 is prevented from movement in any direction with respect to the body 12 when nipples 34 are in sealing engagement with the body. Passageway 42 in each nipple includes torque engaging surfaces 84.

Expanded end portion 72 of the nipple 34 opposite the threads includes recess 78 for receiving an O-ring member 80 or other suitable seal, such as a Teflon TM ring member. On the instrument side, the O-ring or seal typically is not provided on the transmitter flange. Accordingly, the substantially planar exterior surface 63 of the flange is adapted for sealing engagement with the flange of the transmitter (not depicted in FIG. 4) when the O-ring 80 carried by the flange 34 has established sealing engagement between the circular end surface 77 of the nipple and an appropriate sealing surface of the transmitter flange. In other respects, the instrument-side flange and nipple are similar to the process-side flange and nipple.

It is also within the scope of the present invention to electrically isolate an orifice fitting from a valve manifold and/or a valve manifold from a pressure transducer by modifying the components described above. Such electrical isolation both eliminates problems with damage to electrical pressure transducers caused by electric spikes being transmitted down a pipeline to the transducer, and decreases damage to components due to dielectic corrosion. One technique for accomplishing this objective is to fabricate one or more of the removable flanges 22, 24 from a rigid thermoplastic material. Referring to FIG. 1, for example, removable flange 24 could be fabricated from a thermoplastic material, which would electrically isolate the valve manifold from the transmitter. Electrical transmission between these components is not possible through bolts 26, since the heads of the bolt engage only the thermoplastic flange. The non-conductive seal 36 is sandwiched between the transmitter and the special nipple 34, and prevents metal-to-metal contact between these components.

Referring to FIG. 4, another technique for completing electrical isolation between flanged components is depicted. A rectangular-shaped planar non-conductive plastic or other sheet material 180 covers the end of manifold 12, and has a pair of holes for receiving special nipples 34. Sheet 180 is thus sandwiched between the end of the valve manifold and the metallic flange 34. Electrical isolation between the metallic flange and the special nipple 34 is accomplished by a pair of identical tubular isolation members 182, also fabricated from a non-conductive material. A first tubular section 184 has an internal diameter for sliding over the threads 82 and fitting snuggly on the main body of the special nipple. An expanded diameter section 186 covers expanded end portion 72 of the nipple. Sections 184 and 186 are joined by step section 188, which is sandwiched between surfaces 66 and 77. During assembly, sheet 180 is positioned against the manifold body, the nipples 34 are pressed into a respective isolation member 182, and fitted within the flange. Threading of the special nipples to the manifold body thus achieves the desired fluid-type connection between the manifold and the nipples, and the desired mechanically rigid connnection between the flange and the manifold body.

When the assembly described above is mounted, for example, to pressure transducer 14, the flange 24 and pressure transducer 14 are in electrical contact, but together are isolated from the manifold body 12 and the special nipples 34 threaded to the manifold body. Again, electrical engagement between the end of the special nipples and the pressure transducer is prevented by seal 36. In similar fashion, electric isolation between flange 102 and manifold body 100 (FIGS. 2 and 3) is possible, with plastic sheet 180 being sandwiched between the flange and the body, and isolation members 184 electrically separating the special nipples 104, 106 from the flange 102.

Figure 2:
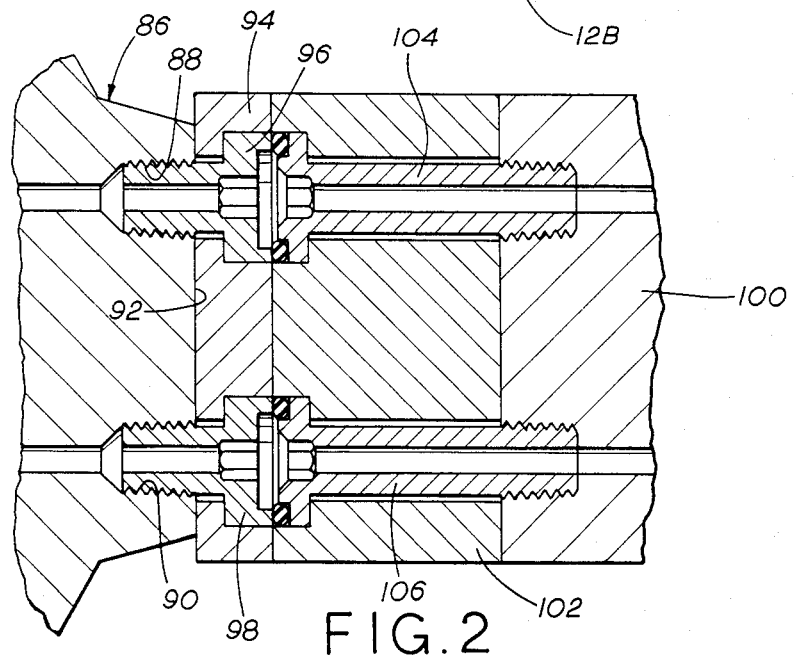
FIG. 2 is a top view, partially in cross-section, of an alternate embodiment of a portion of the apparatus depicted in FIG. 1.
Figure 3:
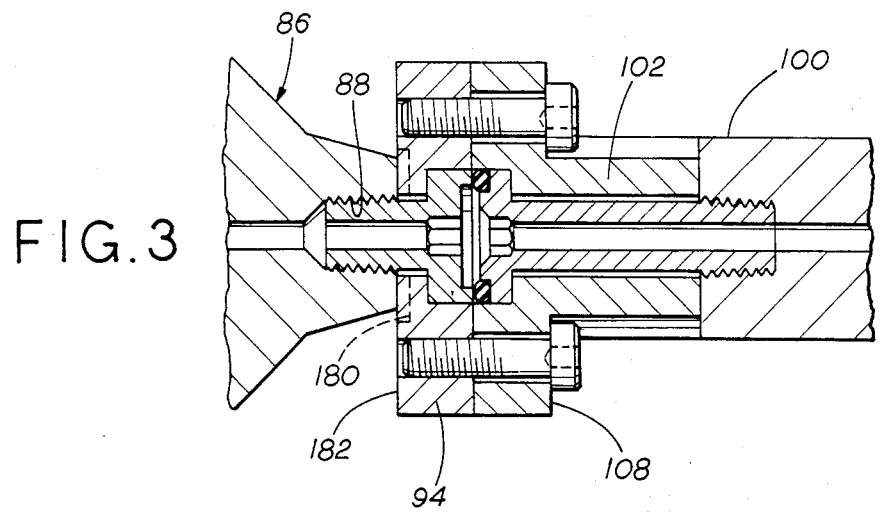
FIG. 3 is a side view, partially in cross-section, of the apparatus depicted in FIG. 2.

Referring now to FIGS. 2 and 3, apparatus is depicted according to the present invention for fixedly mounting a valve manifold and transmitter to an orifice fitting in a close or direct mounting arrangement. Orifice fitting assembly 86 includes a pair of NPT threaded ports 88, 90 each in fluid communication with the respective side of an orifice within the fitting. Fitting 86 is of the type having a substantial planar surface 92 surrounding each of the port openings, and surface 92 typically serves as a reference plane for threading the NPT ports 88, 90 within the fitting. A suitable orifice fitting assembly is depicted in Catalog 200 entitled "Orifice Fittings" and distributed by the Flow Products Division of Daniel Industries, Inc. According to the present invention, reversible flange 94 may be affixed to the planar surface 92 of the fitting 86 by nipples 96, 98. Flange 102 may be secured to the process side of the valve manifold 100 by nipples 104, 106. The manifold 100 (or a combined manifold and transmitter affixed thereto as shown in FIG. 1) with removable flange 102 affixed thereto may then be mounted to flange 94 by the plurality of bolts 108.

One of the features of the present invention relates to the flexibility of choosing from various installation arrangements, and is the reduction in manufacturing costs due to standardization of components. Regardless of whether installation personnel desire the assembly as shown in FIG. 1 or the assembly as shown in FIGS. 2 and 3 (the difference in FIGS. 2 and 3 relating to the direct mounting of the valve manifold to the orifice fitting), the same components may be utilized. Flange 94 affixed to the fitting 86 by special nipples 96 and 98 may thus be identical to flange 22 and nipples 30 previously described. Similarly, flange 102 secured to the manifold by nipples 104, 106 may be identical to flange 24 and nipples 34 previously described. The threaded apertures in flanges 22 or 94 are thus positioned and spaced for receiving either bolts 20 for affixing a pair of football fittings 18, or bolts 108 for interconnecting flange 102 to flange 94.

The significant advantage of the apparatus depicted in FIGS. 2 and 3 is that equipment manufacturing and installation costs have been substantially reduced. Flange 94 is in fixed yet removable engagement with the orifice fitting, flange 102 is a fixed yet removable engagement with the valve manifold, and flange 102 and manifold 100, as a unit, are in fixed yet movable engagement with flange 94 and the orifice fitting. Fluid communication between the orifice fitting assembly and the transmitter is established by nipples 96, 98 in sealing engagement with the NPT threads of the orifice fitting, nipples 104, 106 in sealing engagement with nipples 96, 98 respectively, nipples 104, 106 in sealing engagement with the NPT ports of the valve manifold, flow passageways through the valve manifold, and nipples 36 (FIG. 1) in sealing engagement with the NPT exit ports of the manifold and with the flange of the transmitter 14. Thus, special nipples alone provide the flow path between the orifice fitting and the valve manifold, and between the valve manifold and the transmitter, while the flanges 94, 102 provide solid structural support between the orifice fitting and the manifold, and flange 24 provides solid structural support between the manifold and the transmitter. A significant advantage of the embodiment depicted in FIGS. 2 and 3 is that the manifold or the combined manifold and transmitter may be supported solely by the orifice fitting assembly, thereby substantially reducing installation costs.

Another advantage of the embodiment depicted in FIGS. 2 and 3 relates to increased pressure signal reliability. The signal path and thus the flow volume between the orifice fitting and the transmitter has been substantially reduced, thereby shortening the time delay due to signal travel and minimizing the effects of pulsation. Relatively few components between the orifice fitting and the valve manifold need to be in sealing engagement, thus decreasing the likelihood of leakage.

Figure 5:
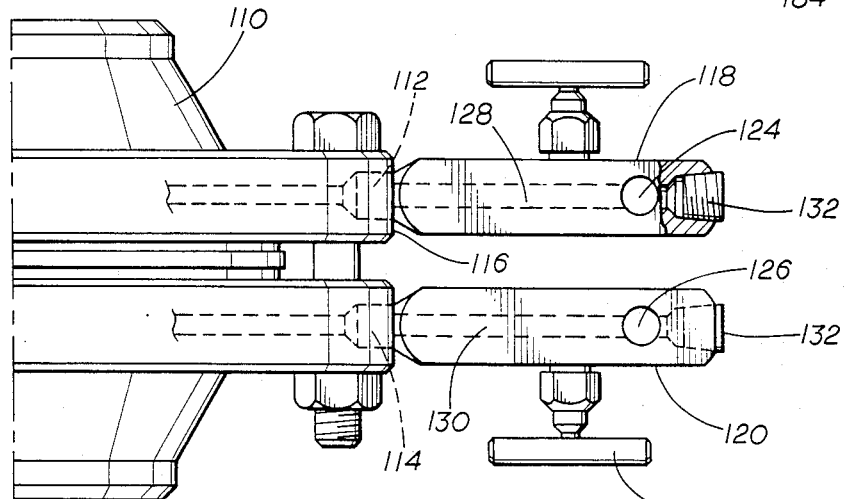
FIG. 5 is a side view of a portion of an orifice fitting assembly with a pair of multiport valves connected thereto.

FIG. 5 depicts an embodiment for use with orifice flange assembly 110. Suitable flanges of such an assembly are more fully described in Catalog Section P entitled "Orifice Flanges" by the Flow Products Division of Daniel Industries, Inc. Orifice flange assembly 110 typically utilizes a "paddle-type" orifice plate sandwiched between the flanges. Threaded NPT ports 112, 114 are in fluid communication with respective sides of the orifice plate, and the flange end surfaces 116 are generally cylindrical-shaped. A pair of multi-port gauge valves 118, 120 each having valve assemblies 122 are threaded to the NPT ports. Each gauge valve 118, 120 may be similar to the gauge valves shown on page 6 of the brochure entitled "Industrial Valves and Manifolds" distributed by General Screw Products Company. The exit ports 124, 126 are threaded for receiving NPT threads, and a flange and special nipples identical to flange 94 and nipples 96, 98 (FIG. 2) may be used to connect the gauge valves 118, 120 with downstream equipment, as shown in FIGS. 2 and 3. It should be understood that the exterior surfaces 128, 130 are each substantially planar and are co-planar, so that the planar surface of flange 94 establishes solid mechanical engagement with the multi-port gauge valves 118, 120. Once flange 94 has been connected to the gauge valves, a manifold (or manifold and transmitter) may be connected to flange 94 by flange 102, as described previously.

A sufficiently solid mechanical connection would be difficult or impossible between a flange with a planar engaging surface and the curvilinear surface of orifice flanges. Gauge valves 118, 120 thus provide a planar surface for receiving a suitable flange according to the present invention. In addition, gauge valves 118, 120 provide increased flexibility for positioning the valve manifold and transmitter relative to the orifice flanges, since the flange, via the special nipples, may be connected to either the right side ports 124, 126 shown in FIG. 5, to the NPT threaded end ports (shown closed with plugs 132 in FIG. 5), or with left side NPT threaded ports (not shown in FIG. 5) on the faces opposing surfaces 128, 130.

The gauge valves 118, 120 shown in FIG. 5 enable the valve assemblies 122 to be closed for any repair/replacement operations required on downstream equipment. Another advantagement of the embodiment shown in FIG. 5 is that the orifice flanges may be oriented with the NPT ports downward, so that valve assemblies 122 may be closed and plugs 132 unthreaded to remove condensate which otherwise may pass to the valve manifold and transmitter. Also, the various exit ports of the gauge valves 118, 120 enable pressure signals to be transmitted to an electronic transducer similar to transmitter 14 shown in FIG. 1, while simultaneously forwarding signals to an alternate pressure signal transducer, such as a chart recorder. The flanges and manifolds described herein may thus be used to connect an electronic pressure transducer to the ports 124, 126 of the multi-port gauge valves, while a chart recorder may be connected by conventional tubing to similar NPT ports on the opposing faces of the gauge valves. An electronic pressure transducer would normally provide a signal which more accurately corresponds to the pressure differential across the orifice, but the recordations from the chart recorder may be viewed by some to be a more reliable indication of the pressure differential and thus the flow through the pipe.

Figure 6:
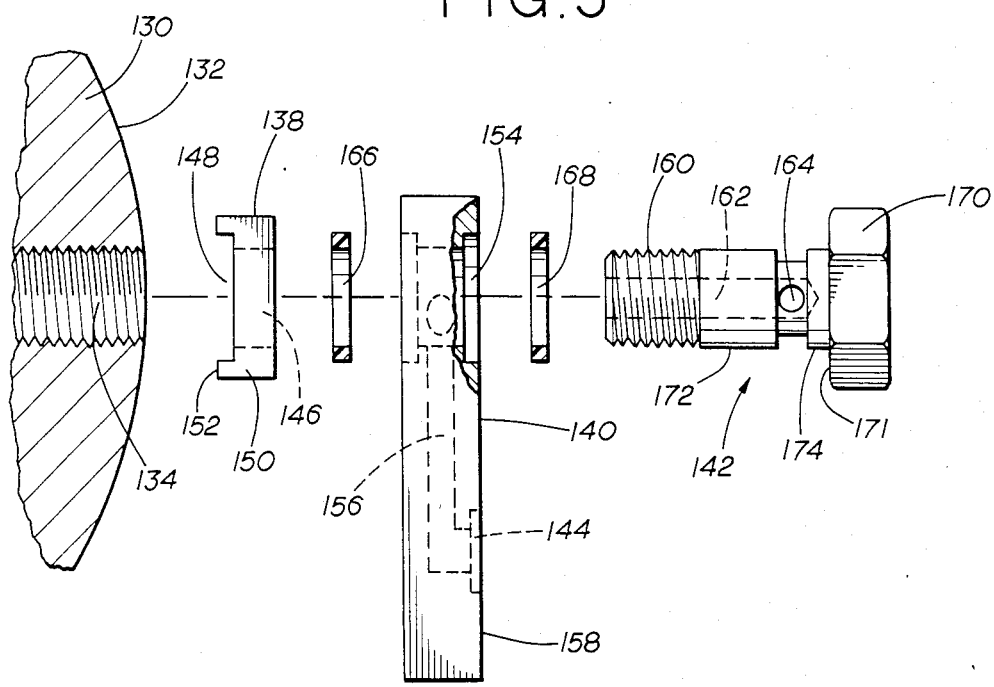
FIG. 6 is an exploded view, partically in cross-section, of a portion of an orifice fitting with a spacer block and a vertical adapter block.

FIG. 6 is a top view of alternate components for mounting to an orifice flange assembly 30, the assembly having cylindical-shaped surfaces 132 adjacent the NPT ports 134, 136. In certain situations, e.g., when gas is being transmitted through a pipeline and thus gas pressure signals are forwarded to a pressure transducer, the accuracy of the pressure transducer is adversely affected unless the pressure transducer is mounted horizontally, i.e., with its diaphram horizontally positioned. If the valve manifold is to be mounted directly to the pressure transducer, as shown in FIG. 1, the input and output ports of the valve manifold also should be in a horizontal plane. Accordingly, it is well known in the art to utilize a vertical adapter to effectively transform two vertically positioned NPT ports into two horizontally positioned NPT ports, so that the valve manifold connected to the horizontally positioned NPT ports may also be horizontally mounted. According to the present invention, however, this same benefit may be accomplished without the use of standard pipe nipples and football connections which increase the signal path and substantially decrease the rigidity of the orifice flange assembly/manifold connection.

Figure 7:
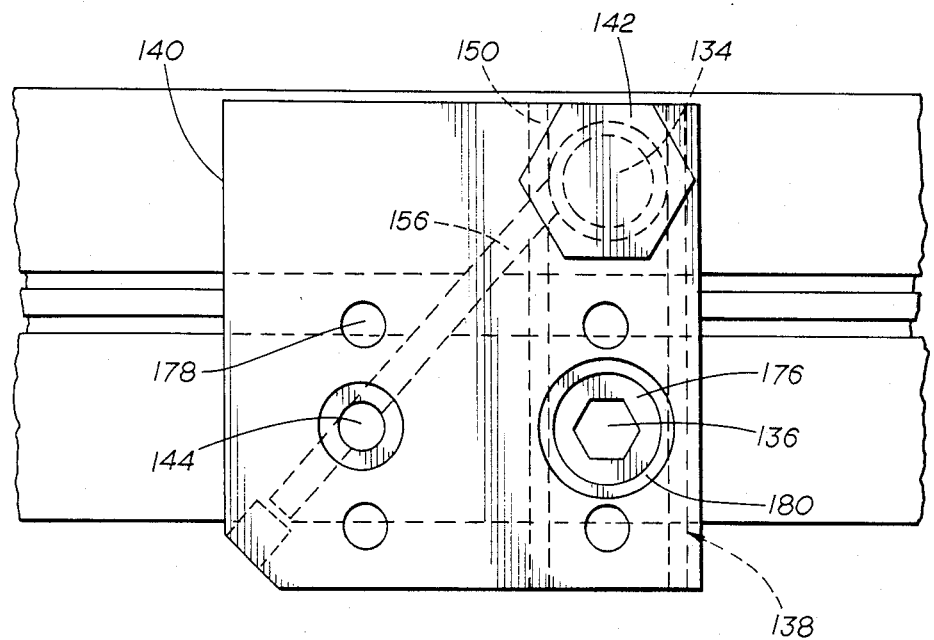
FIG. 7 is an end view, partically in cross-section, of the apparatus depicted in FIG. 6.

Referring to FIGS. 6 and 7, a mounting block 138, a vertical adapter block 140, and special bolt 142 are utilized to change an upper NPT port 134 and a lower NPT port 136 to horizontally positioned ports 138 and 144. It should be understand that, once assembled as described hereafter, a valve manifold 100 with a transmitter directly mounted thereto may be connected in the horizontal position to block 140 and be in fluid engagement with ports 136, 144, and that the entire assembly may be fully supported by the orifice flange assembly.

Elongate spacer block 138 has a bolt and nipple receiving aperture 146. An elongate channel 148 is cut out adjacent the orifice engaging face of the rectangular-cross sectional block 138, forming a pair of elongate ears 150 each having an orifice engaging edge surface 152. The ears 150 thus enable the block 138 to be securely affixed to the cylindrical surface 132. Vertical adapter block 140 has a similar bolt receiving aperture 154 and a transverse passageway 156 for establishing fluid communication between port 134 and port 144. Planar surface 158 adjacent port 144 enables fluid-type communication between passageway 156 and a suitable nipple (e.g. 104) within flange 102.

Special bolt 142 has external NPT threads 160 for sealing engagement with the threads of port 134. An axially positioned cylindical passageway 162 is provided partially through bolt 142, and a radially positioned cylindical passageway 164 establishes fluid communication between passageway 162 and passageway 156. A fluid-tight seal is provided one each side of passageway 164 by Teflon TM washers 166, 168 respectively. The hexagonal head 170 allows the bolt to be easily threaded to port 134, thereby providing an axial compression force on washers 166, 168 to establish sealing engagement between the blocks 138 and 140, and between the block 140 and the head 170 of the bolt. Alternatively, the seal may be established on either side of passageway 164 between the washers 166, 168 and the respective cylindrical exterior surfaces 172, 174 of the bolt. The reduced diameter cross-section adjacent passageway 164 ensures that fluid communication is made between port 134 and passageway 156, regardless of the rotational position of passageway 164. Close tolerance of the thicknesses of blocks 138 and 140, the thicknesses of washers 166 and 168, and the spacing between the threads 160 and the surface 171 on the bolt head is maintained to ensure that sealing engagement between the NPT threads is achieved while simultaneously obtaining the rigid mechanical connection between the block 140 and the orifice flange assembly.

Blocks 138 and 140 are securely mounted to the orifice flange assembly by bolt 142 and special nipple 176. Nipple 176 may be identical to nipple 30 previously described, except that nipple 176 is longer than nipple 30 by the thickness of the block 138. Thus, when nipple 176 is in sealing relationship with the NPT threaded port 136, the nipple 176 also presses block 140 to block 138, and presses block 138 to the surface 132 of the orifice flange, so that both a solid mechanical connection is made and a fluid tight seal is established.

A fluid-tight passageway is thus provided between the upper orifice flange port 138 and port 144 by the special bolt 142 and vertical adapter block 140, with spacer block 138 providing a mechanically sound interconnection of the components but having no affect on maintaining a fluid-tight path. As with nipple 30 previously described, the NPT threads of nipple 176 are in sealing engagement with similar threads of the NPT port, and the outer face of the special nipple is planar for sealing engagement with, e.g., the seal of nipple 104 within flange 102.

With a flange 102 already mounted to a valve manifold via special nipples 34, bolts 108 may be threaded to appropriately positioned threaded passageways 178 provided in block 140, thereby securely mounting the valve manifold to the orifice flange assembly via the vertical adapter block. Seals 80 (see FIG. 4) provide a fluid-tight seal between the outer planar face 180 of nipple 176 and the surface 77 of nipple 34. Similarly, a fluid-tight seal will be obtained between the outer planar face 158 adjacent port 144 of block 140 and surface 77 of another nipple 34.

A significant advantage of the apparatus depicted in FIGS. 6 and 7 relates to repair or replacement of the orifice "paddle" in assembly 130. Although the valve manifold and transmitter may be fully supported by assembly 130 as described herein, removal of the orifice paddle is possible without removing the valve manifold or transmitter. During repair of the paddle, bolt 134 may be unthreaded from the upper NPT port, with the valve flanges described herein, the valve manifold and transmitter supported solely by special nipple 176 secured to the lower NPT port. The orifice flanges may then be axially separated, the paddle replaced, the flanges rebolted, and bolt 134 installed to reestablish flow between the upper NPT port and the horizontally positioned valve manifold, and also to reestablish the desired mechanical connection between the orifice flange assembly and the manifold and transmitter suitable for returning to normal operations.

The removable flange and special nipples of the present invention are thus applicable to any valve manifold having two passageways each having a threaded input port and a threaded output port. Further details regarding the removable flange and special nipples are disclosed in copending Ser. No. 606,668, filed Oct. 31, 1984, and hereby incorporated by reference. The manifold of the present invention may be utilized with either hard-seat or soft-seat valve bodies. The seal between the rotatable valve stem and the valve bonnet may be made according to the teachings of U.S. Pat. No. 4,556,196 or pending application U.S. Ser. No. 729,032, filed Apr. 30, 1985 U.S. Pat. No. 4,597,581 and hereby incorporated by reference.

The concepts of the present invention are not limited by the type of differential pressure sensing equipment or transmitter employed. A suitable transmitter 14 may be provided a shown in FIG. 1 for detecting differential pressure and outputting an electrical signal indicative of that differential pressure. Alternatively, any number of differential presure gauges, meters, or recorders may be utilized, including commonly utilized chart-type meter manifold recorders.

Also, the present invention is not limited to a differential pressure situation, since a three valve instrument manifold as described herein having a pair of ports on a first or inlet face of the manifold and a pair of ports on a second or outlet face of the manifold may be utilized for transmitting a single pressure signal to a transmitter. In this situation, one of the ports on the outlet face would normally be plugged, while the other port may be connected to the instrument or transmitter. The inlet port opposite the plugged outlet port would normally serve as a signal input to the manifold, while the port on the inlet face opposite the instrument port would normally serve as a bleed port controlled by the adjacent valve assembly.

If the orifice flange assembly is mounted with its NPT ports horizontally positioned, multi-port valves may be utilized, as shown in FIG. 5, for mounting a valve manifold and transmitter in the horizontal position. Alternatively, a special flange similar to flange 94 could be utilized, with the section defined by the dashed line 180 in FIG. 3 removed, thus providing a pair of surfaces 182 for engagement with the curvilinear flanges, with surfaces 182 being similar to surfaces 152 shown in FIG. 6. In this latter case, the nipples for threaded engagement with the orifice flange ports may have to be modified to ensure that a proper NPT seal is made simultaneously with the nipples forcing the flange into rigid engagement with the orifice flange assembly.

The terms "orifice fitting" and "orifice flange assembly" are used herein interchangably, although the former term has generally been used when the output ports of the device are adjacent a planar surface, and the latter term used when the output ports are adjacent a curvilinear surface. These ports are similar to the ports of the manifold body, in that the ports are each partially defined by a threaded sidewall adapted for receiving the tapered NPT thread of a remote coupling end connector.

Those skilled in the art will recognize that a vertical adapter block may also be utilized if an orifice fitting is mounted with the ports vertically arranged. Multi-port valves may also be connected to an orifice fitting and then the flanges, manifold and transmitter as an assembly connected to the multi-port valves if another mounting arrangement of these components relative to the orifice fitting is preferred.

Other alternative forms of the present invention will suggest themselves from a consideration of the apparatus and techniques herein discussed. Accordingly, it should be fully understood that the apparatus described herein and shown in the accompanying drawings are intended as exemplary embodiments of the invention, but not as limitations thereto.

What is claimed and desired to be secured by Letters Patent is:

1. In apparatus for interconnecting an orifice fitting to a pressure detector, said orifice fitting including a pair of pressure transmitting ports each at least partially defined by a tapered thread sidewall, a valve manifold for transmitting signals to said pressure detector, said valve manifold including a manifold body having first and second passageway interconnecting respective first and second inlet ports and first and second outlet ports, each of said inlet and outlet ports at least partially defined by a tapered thread sidewall, the improvement comprising:

a first flange for selective removable engagement with a planar surface of said orifice fitting and having first and second nipple receiving apertures;

first and second nipples for independently structurally interconnecting said first flange to said orifice fitting;

a second flange for selective removable engagement with an input end of said manifold body and having third and fourth nipple receiving apertures;

third and fourth nipples for independently structurally interconnecting said second flange to said manifold body;

each of said first, second, third and fourth nipples including a central passageway for transmitting fluid pressure from said orifice fitting to said valve manifold, said passageway at least partially defined by torque engaging surfaces for facilitating rotation of said nipple, a threaded end including a tapered thread for sealing engagement with said tapered thread sidewall of one of said orifice fitting or manifold body ports, a stop portion for forcing and retaining said first or second flange into rigid engagement with said orifice fitting or manifold, respectively, and axial spacing between said stop portion and said tapered thread being selected so that said nipple forces said flange into rigid engagement with said orifice fitting or manifold body when said tapered thread is in sealing engagement with said tapered thread sidewall of one of said ports; and structural interconnection means for removably interconnecting said first and second flanges.

2. Apparatus as defined in claim 1, further comprising:

first sealing means for sealing an end of said first nipple with an end of said third nipple; and second sealing means for sealing an end of said second nipple with an end of said fourth nipple.

3. Apparatus as defined in claim 2, wherein each of said nipples further comprises:

a substantially planar circular-shaped end surface opposite said threaded end for sealing engagement with said first or second sealing means.

4. Apparatus as defined in claim 1, wherein each of said nipples has a substantially cylindrical configuration with a central axis.

5. Apparatus as defined in claim 1, wherein said interconnection means is spaced radially outwardly from said nipples.

6. Apparatus as defined in claim 1, wherein each of said first and second flanges further comprises:

first and second substantially planar and opposing end surfaces; and a substantially planar circular-shaped lip surface spaced between said planar surfaces for engagement with said stop portion.

7. Apparatus as defined in claim 1, further comprising:

a third flange for selective removable engagement with an output end of said manifold body and having fifth and sixth nipple receiving apertures;

fifth and sixth nipples for independently structurally interconnecting said third flange to said manifold body; and detector interconnecting means for removably interconnecting said third flange to said pressure detector.

8. Apparatus as defined in claim 7, wherein at least one of said first, second or third flanges is formed from an electrically non-conductive material for electrically insulating said orifice fitting from said pressure detector.

9. Apparatus as defined in claim 7, further comprising:
a non-conductive sheet material sandwiched between said manifold body and said second or third flange; and
a pair of non-conductive tubular isolation members each for receiving a substantial portion of one of said third, fourth, fifth or sixth nipples and for electrically isolating said nipple from its respective flange;
whereby said orifice fitting is electrically isolated from said pressure detector.

10. Apparatus for interconnecting an orifice flange assembly having an external curvilinear surface adjacent at least one of its pressure signal transmitting ports to a valve manifold including a manifold body having first and second passageway interconnecting respective first and second inlet ports and first and second outlet ports, each of said orifice flange signal transmitting ports, said inlet ports and said outlet ports at least partially defined by a tapered thread sidewall, the apparatus comprising:
first and second bodies each having a threaded first end including a tapered thread for sealing engagement with one of said orifice flange signal transmitting ports;
said first and second bodies each having a fluid passageway through said body and an output port adjacent a substantially planar exterior surface, said exterior surfaces of said first and second bodies lying within a substantially single plane;
a flange for selective removable engagement with a input end of said manifold body and having first and second nipple receiving apertures;
a pair of nipples for independently structurally interconnecting said flange to said manifold body, each of said nipples including a central passageway for transmitting fluid pressure from said orifice fitting to said valve manifold, said passageway at least partially defined by torque engaging surfaces for facilitating rotation of said nipple, a threaded end included a tapered thread for sealing engagement with said tapered thread sidewall of one of said manifold body inlet ports, a stop portion for forcing and retaining said flange into rigid engagement with said manifold body, and axial spacing between said stop portion and said tapered thread being selected so that said nipple forces said flange into rigid engagement with said manifold body when said tapered thread is in sealing engagement with said tapered thread sidewall of one of said inlet ports; and
interconnection means for removably interconnecting said flange to said first and second bodies.

11. Apparatus as defined in claim 10, wherein
each of said first and second bodies is a valve body having a plurality of outlet ports; and
said interconnection means includes another flange, another pair of nipples for structurally interconnecting said another flange to said first and second bodies, and flange interconnection means for removably interconnecting said flange and said another flange.

12. Apparatus as defined in claim 10, further comprising:
a spacer block member sandwiched between said first and second bodies and said orifice flange assembly, said spacer block member having a pair of elongate projections for engagement with said exterior curvilinear surface of said orifice flange assembly for securely mounting said first and second bodies to said orifice flange assembly.

13. Apparatus as defined in claim 12, wherein said second body includes a central passageway for transmitting fluid pressure, said passageway at least partially defined by torque engaging surfaces for facilitating rotation of said second body;
a stop portion on said second body for forcing and retaining a portion of said first body and said spacer block member into rigid engagement with said curvilinear surface of said orifice flange assembly; and
axial spacing between said stop portion and threaded end of said second body selected so that said stop portion forces said portion of said first body and said spacer block member into rigid engagement with said orifice flange assembly when said threaded end is in sealing engagement with said tapered thread sidewall of one of said signal transmitting ports.

14. Apparatus as defined in claim 12, wherein said first body comprises:
a bolt portion including said tapered thread at one end and a head at another end with torque engaging surface;
a vertical adapter block portion having a fluid passageway terminating at said outlet port;
said bolt portion including a passageway for establishing fluid communication between one of said orifice flange signal transmitting ports and said adapter block passageway; and
axial spacing between said bolt head and said tapered thread selected so that said bolt portion forces said vertical adapter block and said spacer block member into rigid engagement with said orifice flange assembly when said tapered thread is in sealing engagement with said tapered thread sidewall of one of said signal transmitting ports.

15. Apparatus as defined in claim 14, further comprising:
sealing means sandwiched between said spacer block member and said adapter block portion for preventing loss of fluid from said first body.

16. A method of securing a flangeless valve manifold to an orifice fitting having threaded fluid pressure transmission ports, said valve manifold including a manifold body having first and second passageways interconnecting first and second threaded inlet ports and first and second threaded outlet ports, the method comprising:
forming a plurality of nipples each having a central fluid passageway, a tapered thread on an end for sealing engagement with one of said ports, and a stop portion at a selected spacing relative to said tapered thread;
structurally interconnecting a first flange to said orifice fitting by threading first and second of said plurality of nipples to said orifice fitting ports until said stop portion forces that first flange into rigid engagement with said orifice fitting;

structurally interconnecting a second flange to an input end of said manifold body by threading third and fourth of said plurality of nipples to said manifold body inlet ports until said stop portion forces said second flange into rigid engagement with said manifold body; and rigidly interconnecting said first flange to said second flange.

17. The method as defined in claim 16, further comprising:

sealing end surfaces between said first and third nipples and between said second and fourth nipples.

18. The method as defined in claim 16, further comprising:

interconnecting said first flange to said second flange with a plurality of bolts each spaced radially outward away from said nipples.

19. The method as defined in claim 16, further comprising:

forming first and second substanially planar and opposing end surfaces on each of said first and second flanges; and forming a substantially planar circular-shaped lip surface on each of said first and second flanges for engagement with said stop portion.

20. The method as defined in claim 16, further comprising:

electrically isolating said orifice fitting from said manifold body.

* * * * *